US011198650B2

(12) United States Patent
Malcolmson

(10) Patent No.: US 11,198,650 B2
(45) Date of Patent: Dec. 14, 2021

(54) TARGETED DELIVERY OF CONCRETE ADMIXTURE

(71) Applicant: David Colin Malcolmson, Kent (GB)

(72) Inventor: David Colin Malcolmson, Kent (GB)

(*) Notice: Subject to any disclaimer, the term of this patent is extended or adjusted under 35 U.S.C. 154(b) by 370 days.

(21) Appl. No.: 16/331,882

(22) PCT Filed: Sep. 12, 2017

(86) PCT No.: PCT/GB2017/000131
§ 371 (c)(1),
(2) Date: Mar. 8, 2019

(87) PCT Pub. No.: WO2018/051052
PCT Pub. Date: Mar. 22, 2018

(65) Prior Publication Data
US 2019/0194079 A1 Jun. 27, 2019

(30) Foreign Application Priority Data

Sep. 13, 2016 (GB) ..................................... 1615520
Feb. 17, 2017 (GB) ..................................... 1702591

(51) Int. Cl.
| | | |
|---|---|---|
| *C04B 40/06* | (2006.01) | |
| *B28B 7/36* | (2006.01) | |
| *B65D 65/46* | (2006.01) | |
| *B01F 15/02* | (2006.01) | |
| *B28C 7/06* | (2006.01) | |
| *B29C 48/00* | (2019.01) | |
| *C04B 16/04* | (2006.01) | |
| *C04B 40/00* | (2006.01) | |
| *E04G 9/10* | (2006.01) | |
| *C04B 103/00* | (2006.01) | |
| *B29K 29/00* | (2006.01) | |
| *B29K 509/06* | (2006.01) | |

(52) U.S. Cl.
CPC ...... *C04B 40/0633* (2013.01); *B01F 15/0207* (2013.01); *B28B 7/36* (2013.01); *B28C 7/064* (2013.01); *B29C 48/0021* (2019.02); *B29C 48/022* (2019.02); *B65D 65/46* (2013.01); *C04B 16/04* (2013.01); *C04B 40/0032* (2013.01); *E04G 9/10* (2013.01); *B29K 2029/04* (2013.01); *B29K 2509/06* (2013.01); *C04B 2103/0077* (2013.01); *Y10T 428/249994* (2015.04)

(58) Field of Classification Search
CPC . C04B 40/0633; C04B 40/0032; C04B 16/04; C04B 2103/0077; B29C 48/0021; B29C 48/022; E04G 9/10
USPC ...................................................... 428/320.2
See application file for complete search history.

(56) References Cited

U.S. PATENT DOCUMENTS

| | | |
|---|---|---|
| 3,057,127 A | 10/1962 | Gex et al. |
| 4,213,926 A | 7/1980 | Toyoda et al. |
| 4,961,790 A | 10/1990 | Smith et al. |
| 2012/0067250 A1 | 3/2012 | Bracegirdle |
| 2013/0192168 A1 | 8/2013 | Bracegirdle |
| 2016/0010346 A1* | 1/2016 | Calmes .................... E04G 9/10 249/15 |

FOREIGN PATENT DOCUMENTS

| | | |
|---|---|---|
| JP | 2000141343 | 5/2000 |
| WO | 2014137226 A2 | 9/2014 |

OTHER PUBLICATIONS

Search Report for priority application No. GB1615520.2, dated Mar. 21, 2017, 3 pages.
Search report for priority application No. GB1702591.7, dated Jul. 19, 2017, 5 pages.
International Search Report for PCT/GB2017/000131, dated Feb. 26, 2018, 6 pages.

* cited by examiner

*Primary Examiner* — Hui H Chin
(74) *Attorney, Agent, or Firm* — Patrick Lavender; The Patent Shoppe

(57) ABSTRACT

A sheet 100 of water-soluble material such as polyvinyl alcohol comprises a plurality of individual, sealed pockets 110, each containing concrete admixture. The sheet is cut to size and attached to the interior of a formwork structure 200 with, for example, PVA glue. After concrete is poured into the formwork, covering the sheet 100, the sheet dissolves, releasing the admixture onto the surface of the concrete as it sets. In another arrangement, a sealed container 300 formed from a water-soluble material contains concrete admixture. The external wall of the container has a plurality of regions 320 where a thickness of the wall is reduced. The container is attached to interior walls of a formwork structure 200 or to reinforcing bars inside a formwork structure. After concrete is poured into the formwork, submerging the container, the container dissolves, with the thinner regions dissolving sooner, releasing the admixture into the concrete.

11 Claims, 3 Drawing Sheets

TARGETED DELIVERY OF CONCRETE ADMIXTURE

This application is a National Phase Application under 35 U.S.C. § 371 of International Application No. PCT/GB2017/000131, filed on Sep. 12, 2017, which claims priority to both UK Application GB1702591.7, filed on Feb. 17, 2017, and to UK Application GB1615520.2 filed on Sep. 13, 2016, the disclosures of each of which are incorporated by reference in their entireties for all intended purposes.

The present invention relates to the addition of chemical admixtures to concrete that is poured into shuttering or formwork.

Formwork or shuttering is a structure used to contain and mould concrete. Depending on requirements, formwork moulds are made from timber, steel, aluminium, plastic or a combination of materials. Wet concrete is poured into the formwork and the formwork is stripped away from the concrete once it has set.

Admixtures are chemicals that are added to wet concrete to modify the concrete's characteristics. Accelerators and retarders change the rate at which the concrete hardens. Pigments change the colour of the concrete. Hardeners, plasticisers, corrosion inhibitors, bonding agents and other chemicals are all also used depending on requirements.

Admixtures can be added to concrete as the concrete is being mixed. The admixture disperses throughout the concrete to affect the characteristics of the entire batch. Surface admixtures are also used. Some surface admixtures are sprayed onto the surface of freshly poured concrete while others are painted onto formwork before the concrete is poured.

Correct use of admixtures is difficult. The correct quantity must be added to a mixer, at the correct time. When adding accelerants during the mixing stage, the resulting concrete must be poured quickly and there is a risk of it setting as it traverses long pipes when pouring at height. Painting or spraying surface admixtures is potentially hazardous and messy, and can result in a poor finish if the admixture is applied unevenly, or if it runs or is washed away.

Pre-weighed bags of admixture are used to reduce the chances of error or spillage when adding admixture to a concrete mixer. U.S. Pat. No. 4,961,790 describes a container made from a water-soluble material, such as polyvinyl alcohol (PVA/PVOH), polyethylene oxide or paper, which contains a pre-weighed amount of a solid or powdered admixture. The container is placed in a concrete mixer and dissolves as it is agitated, releasing the admixture into the concrete. US-A-2012/0,067,250 describes a similar dosing bag formed from a dissolvable, starch-based film.

The present invention provides a means for targeted delivery of concrete admixture comprising a sheet formed from a water-soluble material, the sheet having a plurality of sealed pockets extending across the surface of the sheet in both lateral dimensions, each pocket containing a quantity of admixture.

Advantageously, the sheet can be cut (or even torn by hand if some or all of the spaces between pockets are perforated) to any desired size and shape and attached to some or all of the interior surfaces of a formwork structure. After concrete is poured into the formwork, covering the sheet, the sheet dissolves, releasing the admixture onto the surface of the concrete as it sets. This permits targeted delivery of admixtures, even admixtures that are typically mixed throughout concrete, and avoids the mess and uncertainty associated with admixtures that are typically brushed onto the surface of formwork.

Preferably, the water-soluble material is polyvinyl alcohol. This is a safe, readily available material which readily dissolves when submerged in concrete. Admixture may also be mixed with the polyvinyl alcohol itself.

Preferably, the pockets are closely packed to ensure an even distribution of admixture.

Preferably, the pockets are triangular in outline to permit the sheet to be cut to a wide range of different shapes and sizes without having to cut through a pocket, releasing the admixture sealed inside.

In another aspect, the present invention provides a method of targeted delivery of concrete admixture comprising: fixing a sheet as described above to a surface of a formwork structure; and pouring concrete into the formwork to immerse the sheet. The immersed sheet dissolves in the concrete, releasing the admixture sealed within the pockets in a targeted manner.

Advantageously, the sheet can be cut to a desired size and shape before fixing it to the surface of the concrete formwork.

In another aspect, the present invention provides a method of manufacturing a means for targeted delivery of concrete admixture, comprising: extruding a sheet of polyvinyl alcohol; forming a plurality of pockets in the surface of the sheet, the pockets extending across the surface of the sheet in both lateral dimensions; placing measured quantities of admixture into each pocket; and sealing the plurality of pockets with the admixture inside.

In this way, large sheets of admixture-containing pockets can be produced from which pieces of the desired shape and size can be cut.

The present invention also provides a means for targeted delivery of concrete admixture comprising a sealed container formed from a water-soluble material, an external wall of the container having a plurality of spaced apart regions where a thickness of the external wall in each region is less than a thickness of the external wall surrounding the region.

Advantageously, the container can be attached to formwork or to reinforcing bars (rebar) within a formwork structure. As concrete is poured into the formwork, submerging the container, the wall of the container dissolves, releasing the admixture inside. The thinner areas of the wall dissolve sooner than the thicker areas to release the admixture at the desired rate or at a desired time after submersion. The thicker sections of the wall provide greater structural strength to the container than if the whole container were made with thinner walls.

Preferably the spaced apart regions are evenly spaced over the external wall. Preferably the spaced apart regions are arranged in a regular pattern over the wall. Spacing the thinner regions apart evenly and/or in a regular pattern, such as a grid improves the structural strength of the container, preventing weak points.

Preferably the container comprises a plurality of compartments separated by one or more internal walls, each compartment containing admixture. Having several compartments within the container helps ensure that the admixture is released in stages as the container dissolves.

Preferably an internal wall between compartments is configured to permit splitting of the container into separate pieces without opening the container. This permits the container to be resized for smaller spaces.

Preferably the container includes a tongue at a first end and a matching groove at an opposite end to permit connection of two such containers. This permits several containers to be joined to create a longer or larger container for larger concrete shapes.

Preferably the container comprises an elongate tube. A relatively long, thin tube can be attached easily to rebar or formwork using clips or ties.

In another aspect, the present invention provides a means for delivering tiles to the surface of a concrete pour comprising a water-soluble material encasing a plurality of tiles. By encasing tiles in water-soluble material, their relative positions are fixed and a tiled surface can be applied to moulded concrete with ease.

Preferably, grout is placed in an at least one hollow region of the water-soluble material located between the tiles. This automatically grouts the tiles as the water-soluble material dissolves.

Preferably, the means includes a plurality of pockets formed from the water-soluble material, the pockets containing a bonding material for bonding the tiles to concrete. This ensures that the tiles are firmly attached to the concrete surface.

Preferred embodiments of the present invention will now be described by way of an example and with reference to the accompanying drawings, in which.

Embodiments of the present invention provide a means for targeted delivery of admixture to concrete surfaces in a way that is simple, effective and mess/hazard free.

Figure 1:
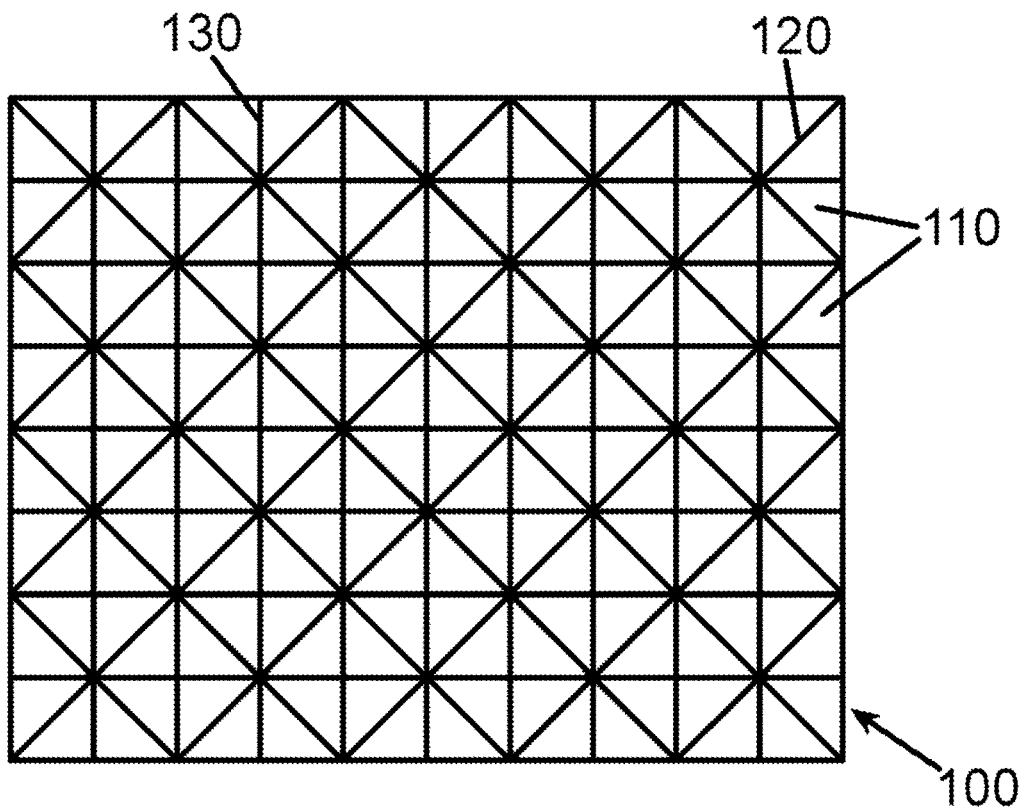
FIG. 1 illustrates a strip of admixture-containing pockets.

FIG. 1 illustrates a sheet or strip 100 of individual admixture-containing, thin-walled pockets or pouches 110. Each individual pocket 110 contains a quantity of concrete admixture which may be in liquid, solid or powder form. The edges 120 of each pocket 110 are sealed to prevent admixture from escaping the pockets or moving between pockets. The strip 100 can be cut along these edges 120 to create smaller pieces of a desired shape and size without breaking open any individual pocket 110 and spilling the contents. Some or all of the edges 120 may be provided with perforations to enable the strip 100 to be torn into smaller pieces by hand.

Figure 2:
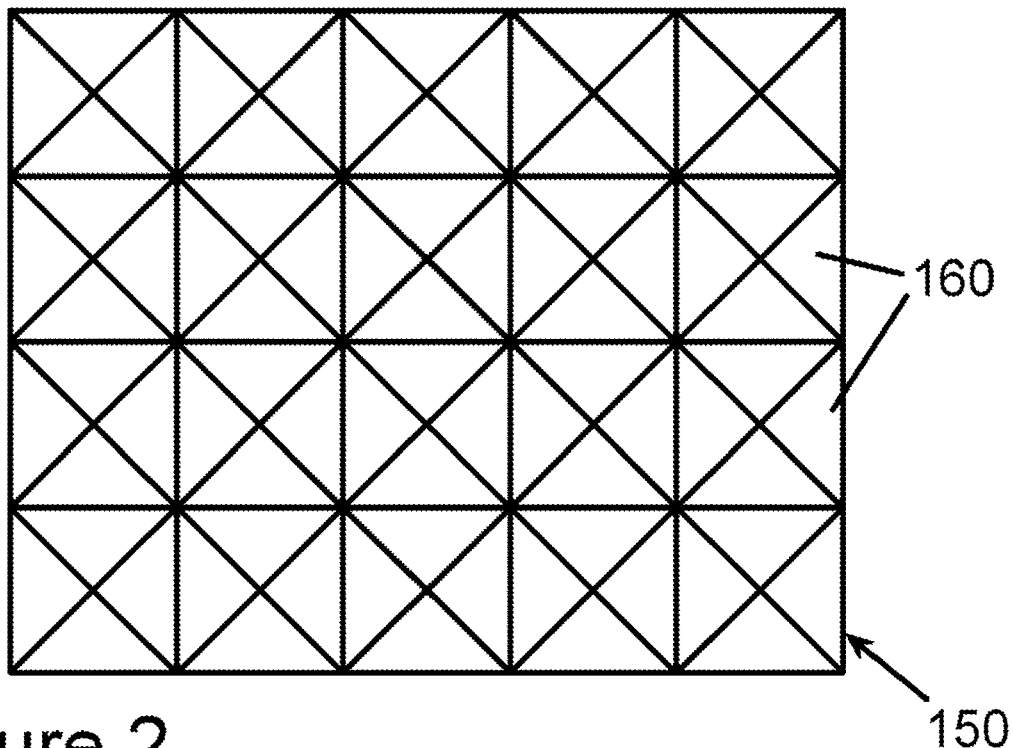
FIG. 2 illustrates an alternative arrangement of admixture-containing pockets.

As illustrated in FIG. 1, the outline of each individual pocket 110 may be in the shape of a small triangle with the triangular pockets arranged in a square grid pattern over the strip 100. This simple arrangement enables the strip 100 to be cut to a wide range of different sizes and shapes. However, many other different arrangements are possible. FIG. 2, for example, illustrates a strip 150 of individual pockets 160 that are formed as relatively larger triangles arranged in a square grid. The pockets may also be square, rectangular, circular, oval or any other shape as desired and arranged in many different patterns across the strip. The exact shapes and arrangements used may depend on manufacturing limitations, the desired flexibility in cutting the strip to size, and/or the desired delivery of admixture.

In general, a full strip 100 is in the shape of a square or rectangle having sides of between 0.75 m and 2 m, preferably approximately 1 m. This shape and size is reasonable for transport and storage and for cutting off smaller pieces for use. Each individual pocket 110 has lateral dimensions of between approximately 1 cm to 3 cm. The sealed edges 120 separating each pocket 110 are as narrow as possible to ensure an even distribution of admixture. When filled with admixture, each pocket is approximately 0.5 cm to 5 cm deep. The walls of each pocket are preferably between 1 mm and 5 mm thick. These dimensions are intended to give an idea of the range of sizes that may be suitable under different circumstances.

The strip 100 is made from a water-soluble material such as polyvinyl alcohol (PVA or PVOH) though other suitable materials are known and described in U.S. Pat. No. 4,961,790 and US-A-2012/0,067,250. Different materials may be necessary for different admixtures to make sure the strip 100 is not dissolved by the particular admixture it contains and dissolves at a suitable rate when submerged in concrete.

Admixture may also be combined or mixed with the material of the strip 100. Consequently, the admixture interacts with the concrete even before the main quantity of admixture has been released from the pockets 110 of the strip 100. Suitable admixtures for mixing with PVA include plasticisers.

The material of the strip 100, the shape, size and the thickness of the walls of the pockets 110, and the quantity of admixture contained within each pocket are selected based on many different factors. The objective is that when a strip is attached to formwork and wet concrete poured over the strip 100, the walls of the pockets 110 dissolve and release the admixture onto the surface of the concrete to have the desired effect.

For example, where the admixture is a retarding agent, which is typically a relatively low viscosity liquid requiring a relatively small amount per unit surface area of concrete, the dimensions of each pocket 110 will be relatively small. Each pocket 110 may measure approximately 1 cm in the lateral directions and be approximately 0.5 cm thick. Small pockets of free flowing admixture ensure an even distribution on the surface of the concrete. In comparison, other admixtures such as dyes may require much larger pockets 110, measuring approximately 2 cm in each lateral direction and approximately 4 cm in depth. The precise variables can be easily determined by a suitably skilled person through a combination of expert knowledge and experimentation. Subsequently, strips of the correct dimensions having pre-measured quantities of admixture contained within each pocket can be prepared for a given situation to conveniently and reliably achieve the desired effect.

Figure 3:
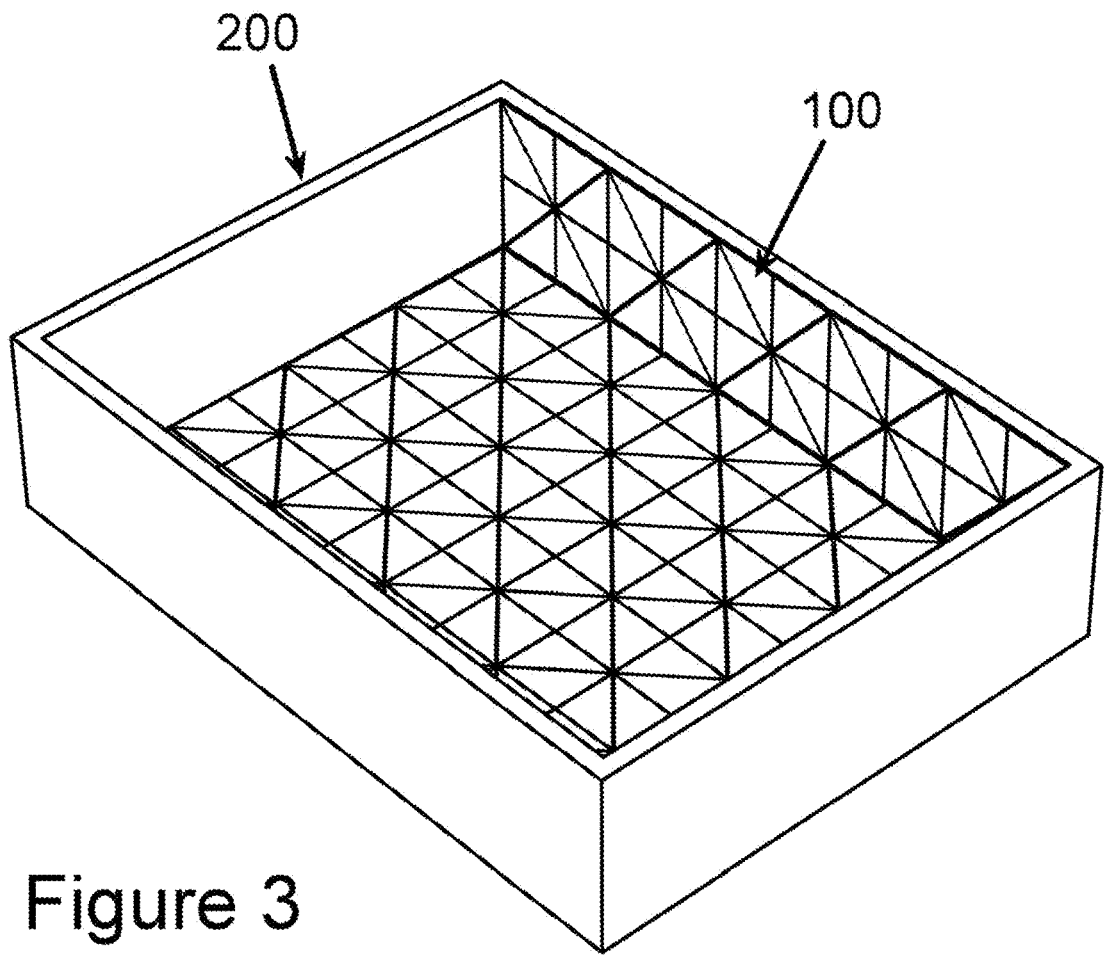
FIG. 3 illustrates pieces of admixture-containing pockets fixed to the bottom and to one side of the interior of a formwork structure.

In use, the pieces of strip 100 are cut to size and attached to the interior walls of a formwork structure 200 as illustrated in FIG. 3. In FIG. 3, the formwork 200 is in the shape of a rectangular box and pieces of strip 100 are provided along the entirety of the bottom surface and one side wall of the formwork 200. This is an example only. Formwork may be in many different shapes and sizes and pieces of strip may be attached to only part of any given expanse of a formwork panel or may cover the whole interior of a formwork structure.

The strip 100 may be fixed by any suitable means. Most conveniently, particularly when the strip is formed from PVA, PVA glue may be used to stick the strip to the formwork. The PVA glue will dissolve along with the material of the strip 100 leaving no trace on the finished concrete or on the formwork 200. Alternative means of fixing the strip 100 include nails or tacks pierced through the sealed edges 120 between pockets 110 to avoid piercing the pockets themselves. In some situations, it may not be necessary to fix the strip 100 to the formwork 200 and it can simply be laid in place.

Four examples of advantageous uses of strips 100 to apply admixture in a controlled and targeted manner to the surface of concrete poured into formwork will now be described. Many other potential uses will be apparent to the skilled person.

A formwork 200 structure can be used to define parts of a large slab to be created over several "pours" of concrete. The admixture contained within the pockets 110 can be a retarder which slows the rate at which concrete sets. By placing a strip 100 along one or more side surfaces of the formwork, the concrete along those sides will set at a slower rate than in the rest of the formwork. Once the majority of the concrete is set and the formwork is stripped, the retarded outside edges of the concrete slab can be brushed or washed with a jet washer to remove a portion of the concrete. Particularly where the concrete is an aggregate, this creates an excellent keying surface for bonding to the next slab that is poured.

A release agent or shutter oil is an admixture that is applied to formwork to enable the formwork to be stripped away from the concrete more easily once the concrete has set. Brushing or spraying the oil onto formwork is messy, time consuming and prone to error. By containing the oil in a plurality of pockets in a strip or sheet 100 that is simply fixed to the formwork and dissolve to release the oil only once the concrete is poured, mess is reduced. Furthermore, the pockets contain the correct, pre-measured amount of oil to remove the possibility of error in its application to the formwork, ensuring the oil is effective.

To form reinforced concrete, a rebar structure is placed within the formwork before the concrete is poured. If the formwork has previously been covered with an admixture, this can contaminate the rebar potentially creating a corrosion risk. By containing admixture in dissolvable pockets attached to the formwork, the likelihood and/or amount of contamination are minimised.

As a final example, numerous small patches of strip 100 where the pockets 110 contain a dye or pigment can be used to create aesthetically pleasing patterns or to mark out positions on the concrete surface. Alternatively, different pockets 110 in a larger piece of strip 100 may contain different colours of dye or other different admixtures to create any desired pattern on the concrete. Pockets 110 may also contain sawdust, ground up glass, gravel and/or other materials to produce different textures and effects on the surface of the concrete.

In general, the surface of a concrete pour may be provided with any desired surface pattern, picture and/or texture by creating a strip 100 with pigments and materials in different pockets 110 across the strip or in separate pieces of strip which are then attached to formwork in the correct arrangement. The pattern is permanently imprinted in the concrete surface, reducing subsequent maintenance and repainting.

For example, the concrete surface may be patterned to have the appearance of a brick wall, to provided text or signage, or to display company logos and other advertising. Fluorescent, phosphorescent or reflective materials may be used for safety notices and other visually impactful designs. Concrete for use as road and walkways can be marked with text, lines and other information when moulded rather than being painted afterwards.

Physical objects can also be placed in pockets 110. For road surfaces, for example, cat's eyes and other physical features may be surface mounted into the concrete.

Figure 4:
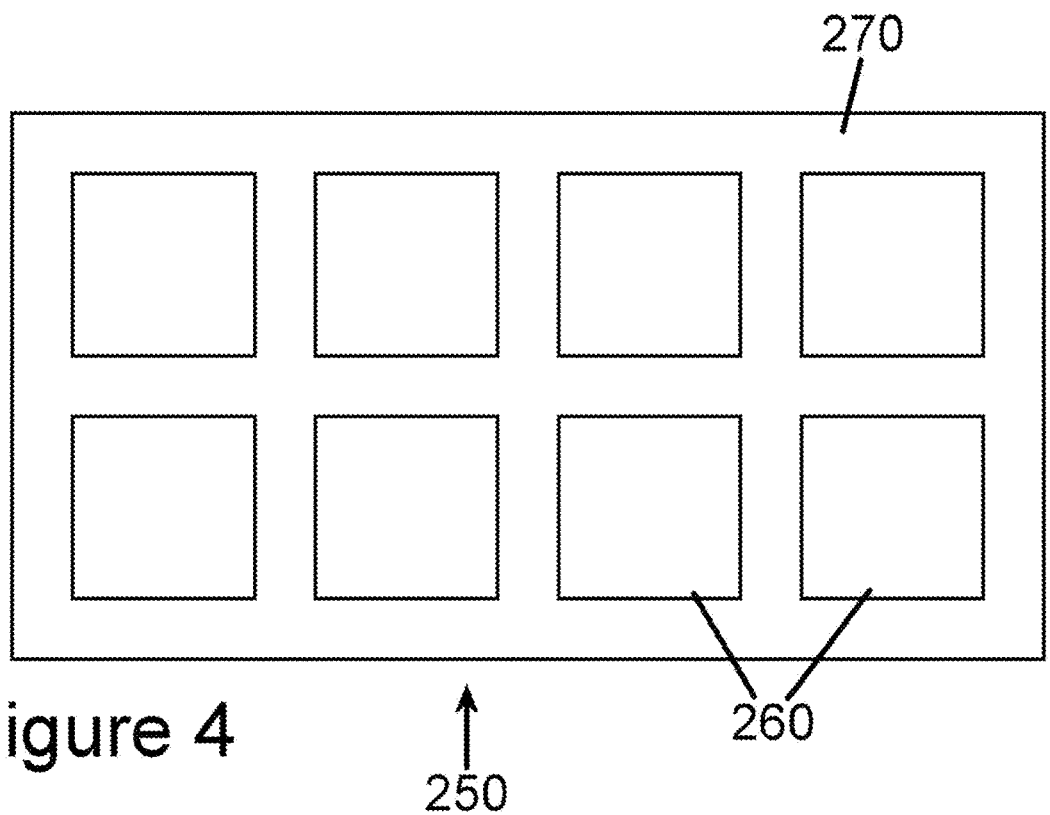
FIG. 4 illustrates a strip encasing tiles.

As illustrated in FIG. 4, a strip 250 of water soluble material may encase a plurality of tiles 260. When the strip 250 attached to formwork and concrete poured into the formwork and over the strip, the water-soluble material dissolves and creates a tiled surface wall on the concrete. Grout can be added afterwards. Preferably, however, the strip 250 includes at least one hollow region or pocket containing grout 270. The grout 270 surrounds the tiles and, as the strip dissolves, is released onto the surface of the concrete and between the tiles 260.

The tiles 260 may be separate from each other or may be joined by a mesh which extends through the hollow region 270. Advantageously, the strip 250 encases the tiles 260 holds all the tiles in place relative to one another so no mesh is required. The tiles 260 may be wall or floor tiles, and may be square, as shown in FIG. 4, or any other shape or range of shapes. The tiles 260 may made from any suitable material such as ceramic or plastic and may be plainly coloured or form a mosaic pattern. The tiles 260 may be decorative and/or may form a protective cladding for the concrete.

To produce a strip 250 as illustrated in FIG. 4, a first layer of water-soluble material, such as PVOH, is laid out and shaped or moulded into a grid or any other pattern as desired.

The first layer is filled with grout 270, then tiles 260 are placed face down in position, i.e. with the decorative side in contact with the first sheet. The moulded pattern in the first sheet holds the individual tiles 270 in place. A second layer of water-soluble material is placed on top of the tiles 260 and grout 270, and sealed to form the strip 250. Optionally, another strip 100 having pockets 110 containing bonder or glue is attached to the second sheet.

The first sheet acts as a protective layer for the tiles 270, and is attached to formwork. The pockets 110 containing bonder dissolve when in contact with concrete and dispense the bonder. Then the second sheet dissolves to release the grout 270 and tiles 260. The first sheet does not come into contact with concrete, so does not dissolve and remains in place to protect the tiles and to aid stripping of the formwork. Once the formwork is stripped, the tiled surface can be hosed down to remove the first sheet.

Figure 5:
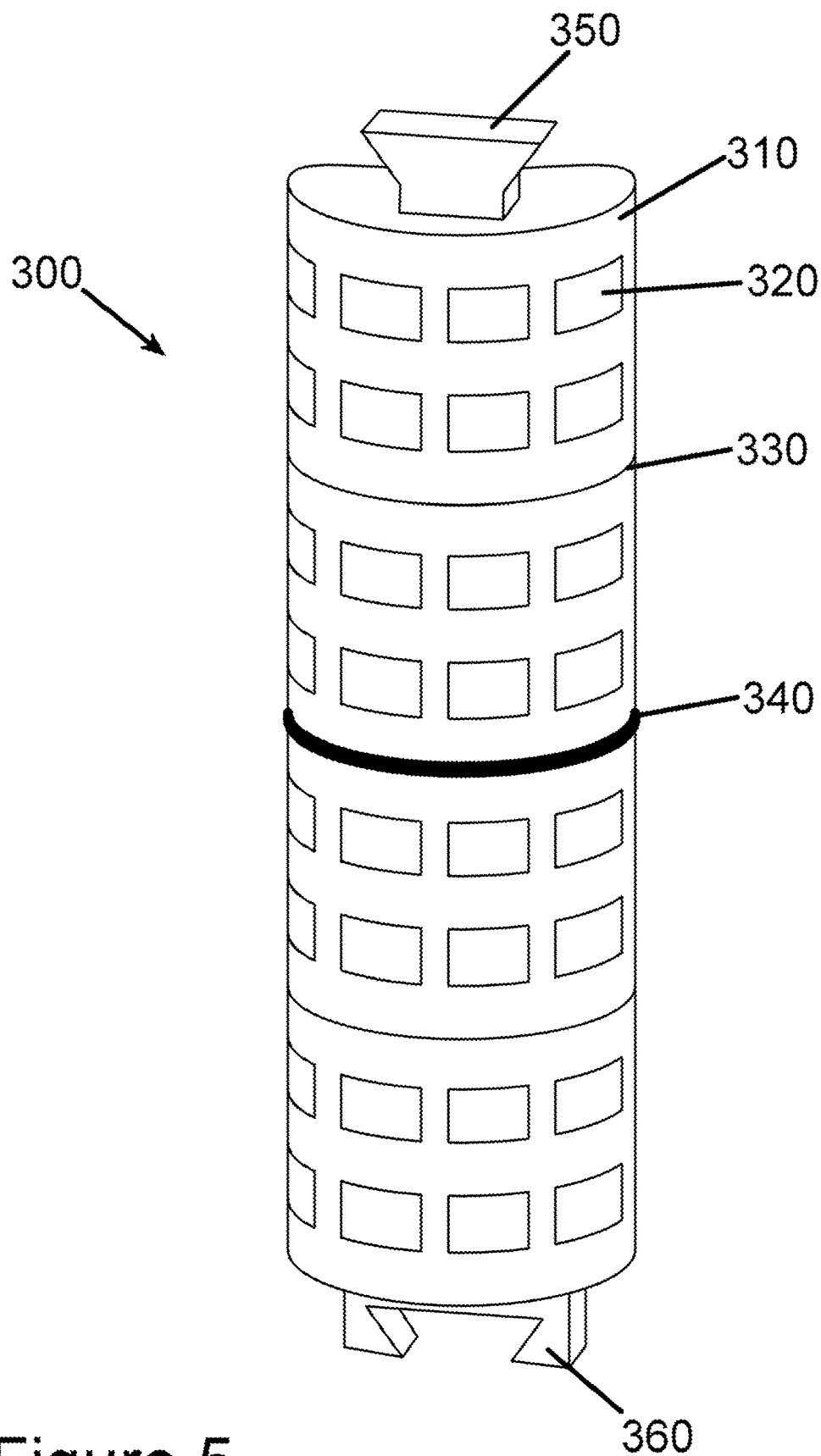
FIG. 5 illustrates an admixture container having regions with thinner external walls.

FIG. 5 illustrates a vessel or container 300 for containing admixture. The container is made from a water-soluble material, such as PVA, as previously described. The container 300 may be any shape but is preferably elongate, being relatively long and thin, to simply attachment of the container along lengths of rebar using clips or ties. In one configuration, the container 300 is an elongate tube approximately 40 cm in length having a roughly circular cross-section approximately 5 cm in diameter. The walls of the container will typically be flexible so it will not maintain any specific cross-sectional shape.

The container 300 has an external wall 310 that seals the admixture inside the container. The external wall 310 includes a plurality of areas or regions 320 where the wall is thinner. When the container 300 is submerged in concrete, these thinner regions 320 dissolve earlier than the rest of the wall 310, releasing the admixture into the concrete. The thickness of the thinner regions 320 is determined based on the desired release rate or timing. The thickness of the rest of the external wall 310 is determined based on considerations such as structural strength of the whole container 300.

The thinner areas 320 can be of any shape and size and can be arranged over the external wall 310 in any desired manner. Preferably, the thinner areas 320 are arranged in a regular grid pattern and spaced apart over the external wall 310 to avoid weak spots. The thinner regions 320 in FIG. 4 are rectangular in outline as this is an easy shape to manufacture. Alternatively, the thinner regions 320 may have circular outlines, triangular outlines or any other desired shape.

The container 300 is preferably split into several separate compartments. Internal walls separate the compartments from each other, each compartment containing its own quantity of admixture, or even different admixtures if desired. A boundary between compartments is indicated at 330.

The compartments may be arranged in any desired manner. Preferably, as illustrated, the container 300 is split into a series of equally sized compartments arranged in a single line along its length. The most suitable size for each compartment depends on factors such as the admixture contained inside, the rate at which the container dissolves 300, and the speed at which concrete is to be poured. Typically, each compartment will be approximately 5 cm long. Although only four compartments are shown in FIG. 4, a preferred configuration where the container 300 is approximately 40 cm long will consequently have eight such compartments.

Preferably, a boundary 340 between at least two compartments enables those compartments to be separated from one another without breaking or opening them. Consequently, the container 300 can be separated into two or more pieces for situations where shorter sections are required. Separation of the compartments may be by cutting, tearing or pulling along the boundary 340. For example, an internal wall at the boundary 340 may be a double wall joined by a releasable adhesive or a section of PVA that can be perforated so that it can be cut or torn away.

At one end of the container 300 there is a tongue 350. At an opposite end of the container 300 is a corresponding groove 360. Two containers 300 can be attached to each other by slotting the tongue 350 of one into the groove 360 of another for situations where longer sections are required.

The tongue 350 and groove 360 are preferably formed from the same material as the rest of the container 300 so that they dissolve without trace when submerged in concrete. Alternatively, they may be formed from metal, plastic or any other suitable material and remain within the concrete after it is set.

Some of the many advantages of using a container 300 for targeted delivery of admixture will be apparent from the preceding discussion of the advantages of using the strip 100 shown in FIGS. 1 and 2.

To produce a strip 100, thin sheets or films of polyvinyl alcohol can be extruded and then thermoformed to create sealed pockets containing the desired quantities of admixture. Similarly, to produce a container 300, sheets of polyvinyl alcohol can be extruded with thinner regions 320 and then thermoformed to seal admixture inside. Other methods of manufacture will be apparent to a suitably skilled person.

The invention claimed is:

1. A device for targeted delivery of concrete admixture comprising a sheet formed from a water-soluble material, the sheet having a plurality of sealed pockets extending across the surface of the sheet in both lateral dimensions, each pocket containing a quantity of concrete admixture and the edges of each pocket being sealed to prevent admixture from escaping the pockets or moving between pockets, at least some of the sealed edges being perforated, wherein the sheet is configured to be separated along the sealed edges without breaking open the pockets to create a smaller sheet of a desired shape and size.

2. The device of claim 1 wherein the pockets are circular in outline.

3. The device of claim 1 wherein the concrete admixture comprises an admixture that is applied to the surface of formwork in normal use.

4. The device of claim 1 wherein the concrete admixture comprises at least one of pigment and texturing material.

5. The device of claim 1 wherein, in use, the sheet is fixed to a surface of a formwork structure prior to pouring the concrete.

6. The device of claim 1 wherein the water-soluble material is polyvinyl alcohol.

7. The device of claim 1 wherein the water-soluble material comprises a mixture of polyvinyl alcohol and a concrete admixture.

8. A method of targeted delivery of concrete admixture comprising:
   fixing a device according to claim 1 to a surface of a formwork structure;
   pouring concrete into the formwork to immerse the fixed device.

9. The method of claim 8 further comprising cutting the device to a desired size and shape before fixing it to the surface of the concrete formwork.

10. The method of claim 8 wherein fixing the device to a surface of a formwork structure comprises fixing with PVA glue.

11. A method of manufacturing a device for targeted delivery of concrete admixture, comprising:
   extruding a sheet of polyvinyl alcohol;
   forming a plurality of pockets in the surface of the sheet, the pockets extending across the surface of the sheet in both lateral dimensions;
   placing measured quantities of concrete admixture into each pocket;
   sealing the plurality of pockets with the concrete admixture inside, the edges of each pocket being sealed to prevent admixture from escaping the pockets or moving between pockets; and
   providing perforations along at least some of the sealed edges;
   wherein the sheet is configured to be separated along the sealed edges between pockets without breaking open the pockets to create a smaller sheet of a desired shape and size.

* * * * *